(12) United States Patent
Ohara

(10) Patent No.: US 7,389,431 B2
(45) Date of Patent: Jun. 17, 2008

(54) DATA PROCESSING DEVICE AND POWER SAVING CONTROL METHOD

(75) Inventor: Eiji Ohara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 384 days.

(21) Appl. No.: 11/176,856

(22) Filed: Jul. 7, 2005

(65) Prior Publication Data

US 2006/0010331 A1 Jan. 12, 2006

(30) Foreign Application Priority Data

Jul. 8, 2004 (JP) ............................. 2004-201802

(51) Int. Cl.
*G03G 15/00* (2006.01)
*G06F 3/00* (2006.01)

(52) U.S. Cl. .................. 713/310; 713/300; 713/320; 713/321; 713/322; 713/323; 713/324; 713/330; 713/340; 710/5; 709/203; 358/1.1; 358/1.14; 358/1.15

(58) Field of Classification Search ................ 713/300, 713/310, 320–324, 330, 340; 710/5; 709/203; 358/1.1, 1.14, 1.15
See application file for complete search history.

(56) References Cited

U.S. PATENT DOCUMENTS

| | | | |
|---|---|---|---|
| 7,020,403 B2 * | 3/2006 | Nomura | 399/8 |
| 7,076,673 B2 * | 7/2006 | Yoshikawa | 713/300 |
| 2002/0140963 A1 * | 10/2002 | Otsuka | 358/1.14 |
| 2003/0169309 A1 * | 9/2003 | Yokoyama | 347/14 |
| 2004/0125399 A1 * | 7/2004 | Kobayashi | 358/1.14 |
| 2005/0007628 A1 * | 1/2005 | Yamano et al. | 358/1.15 |

FOREIGN PATENT DOCUMENTS

| | | | |
|---|---|---|---|
| JP | 8-142458 A | | 6/1996 |
| JP | 408142458 A | * | 6/1996 |
| JP | 2003-246117 A | | 9/2003 |

\* cited by examiner

*Primary Examiner*—Abdelmoniem Elamin
(74) *Attorney, Agent, or Firm*—Rossi, Kimms & McDowell, LLP

(57) ABSTRACT

A data processing device which can communicate with a computer terminal, comprises: a receiver to receive data transmitted from the computer terminal; a shifter to shift a state of the data processing device to a power saving state, after elapse of a predetermined time; and a releaser to release the power saving state according to specific data transmitted from the computer terminal, wherein, after the power saving state was released by the releaser, when the received data is first kind of data, the shifter shifts the data processing device to the power saving state after elapse of a first predetermined time, and, when the data received by the receiver is second kind of data different from the first kind of data, the shifter shifts the data processing device to the power saving state after elapse of a second predetermined time different from the first predetermined time.

16 Claims, 5 Drawing Sheets

DATA PROCESSING DEVICE AND POWER SAVING CONTROL METHOD

BACKGROUND OF THE INVENTION

1. Field of the Invention

The present invention relates to a data processing device and a power saving control method.

2. Related Background Art

Some kinds of conventional data processing devices respectively have two modes, that is, a normal mode and a power saving mode. Here, a print device which is representative of the conventional data processing device starts an operation in the normal mode when the power source thereof is turned on. Further, at the same time, the print device comes into an idle state which is equivalent to a print waiting state. Then, if the state that a print command by a computer terminal connected through an LAN or the like is not received continues for a predetermined time, the print device comes into the power saving mode for controlling power consumption (e.g., Japanese Patent Application Laid-Open No. H08-142458). Moreover, there is a print device which can externally set and change the time by which the device comes into the power saving mode (e.g., Japanese Patent Application Laid-Open No. 2003-246117).

Incidentally, as a kind of power saving mode, a deep sleep mode in which a specific information packet such as Magic Packet™ used for Wake On LAN in recent years is used is known.

In the deep sleep mode, even if the main power source of the data processing device is off, electricity (power) is being fed at all hours to the built-in LAN controller. For this reason, the LAN controller judges whether or not the data sequence corresponding to the inherent physical address set to the data processing device is incorporated in the specific information packet received through the LAN, and, when it is judged that the data sequence is incorporated in the received specific information packet, turns on the main power source. Thus, any electricity (power) is not fed to the circuits other than the LAN controller while the power saving mode is being set, whereby it is possible to more effectively control the power consumption.

In addition, there is a print device which judges whether or not to release a power saving mode based on the kind of received input data (e.g., Japanese Patent Application Laid-Open No. H08-142458). In the relevant print device, the power saving mode is not released in a case where the input data represents a status response command.

In the deep sleep mode, feed of electricity (power) to the data processing device is made lower as much as possible, whereby the effect of power saving is high.

Meanwhile, in case of enabling a computer terminal newly connected on the LAN to use the data processing device connected on the LAN due to installation of the device driver corresponding to the relevant data processing device, it is first necessary to enable the computer terminal to acknowledge all the data processing devices connected on the LAN so as to confirm what kinds of data processing devices being connected on the LAN. To achieve this, the specific information packet for releasing the deep sleep mode is often transmitted unconditionally to all the data processing devices.

Moreover, to acquire the current status information of the data processing device, the computer terminal often transmits the specific information packet for releasing the deep sleep mode to the relevant data processing device.

For these reasons, there is an occasion when the deep sleep mode of the data processing device is released even though any printing is not executed. Moreover, to cause the data processing device of which the deep sleep mode has been once released to come into the deep sleep mode again, it is necessary to wait for the elapse of a predetermined time previously set to each data processing device. Therefore, electric power is needlessly consumed as compared with the deep sleep mode.

SUMMARY OF THE INVENTION

An object of the present invention is to provide a data processing device and a power saving control method which can reduce consumption power even in a case where a power saving state is released.

To attain the above object, the present invention is characterized by providing a data processing device which can communicate with a computer terminal, comprising:

a reception unit adapted to receive data transmitted from the computer terminal;

a shift unit adapted to shift a state of the data processing device to a power saving state after elapse of a predetermined time; and a release unit adapted to release the power saving state according to specific data transmitted from the computer terminal, wherein, after the power saving state was released by the release unit, in a case where the data received by the reception unit is first kind of data, the shift unit shifts the state of the data processing device to the power saving state after elapse of a first predetermined time, and in a case where the data received by the reception unit is second kind of data different from the first kind of data, the shift unit shifts the state of the data processing device to the power saving state after elapse of a second predetermined time different from the first predetermined time.

Moreover, to attain the above object, the present invention is also characterized by providing a power saving control method for a data processing device which can communicate with a computer terminal, the method comprising:

a reception step of receiving data transmitted from the computer terminal;

a shift step of shifting a state of the data processing device to a power saving state after elapse of a predetermined time; and a release step of releasing the power saving state according to specific data transmitted from the computer terminal, wherein, in the shift step, after the power saving state was released in the release step, in a case where the data received in the reception step is first kind of data, it shifts the state of the data processing device to the power saving state after elapse of a first predetermined time, and in a case where the data received in the reception step is second kind of data different from the first kind of data, it shifts the state of the data processing device to the power saving state after elapse of a second predetermined time different from the first predetermined time.

DETAILED DESCRIPTION OF THE PREFERRED EMBODIMENTS

Hereinafter, the embodiments of the present invention will be described in detail with reference to the attached drawings.

Figure 1:
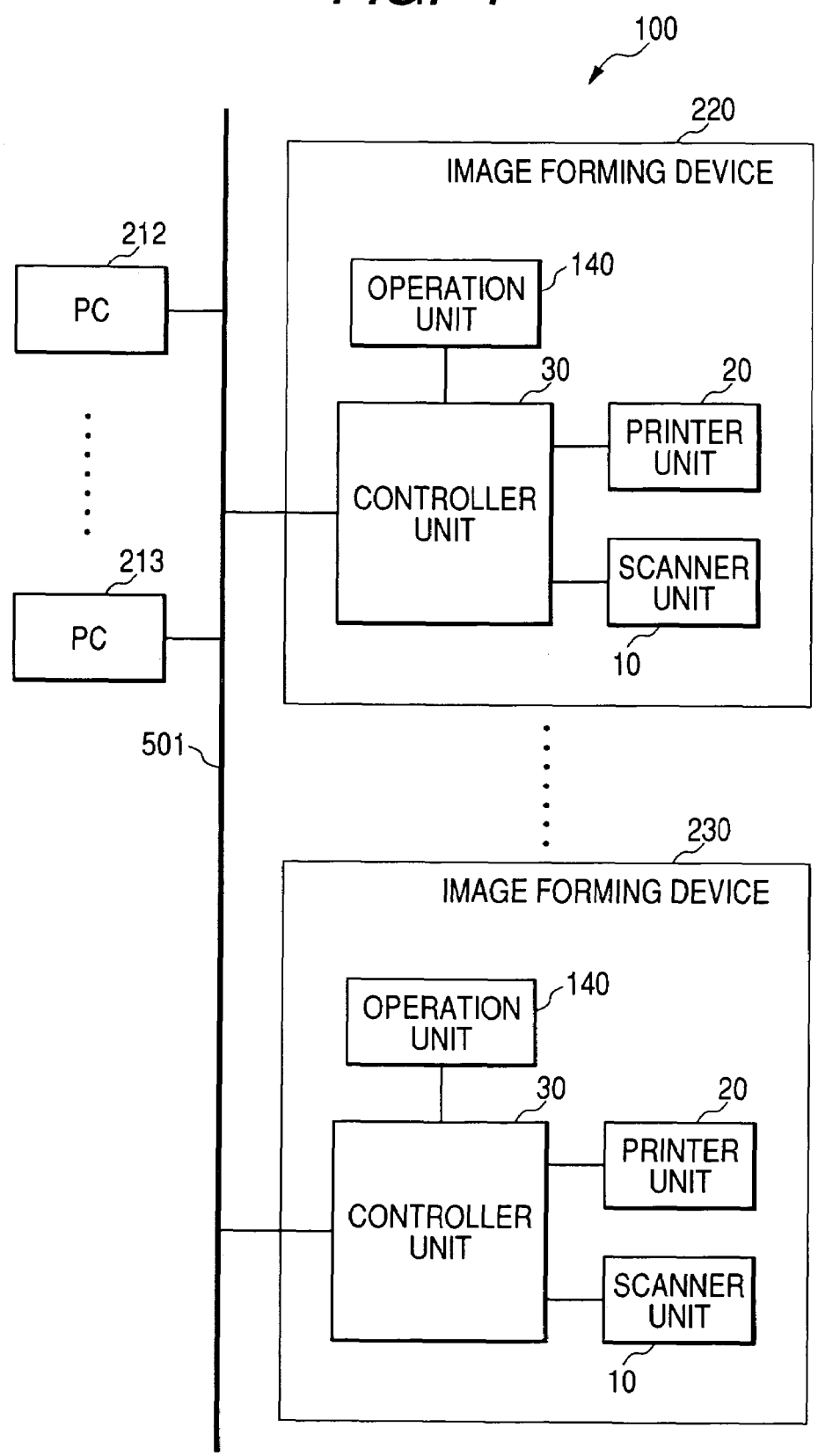
FIG. 1 is a block diagram schematically showing structure of a print system having a data processing device according to the embodiment of the present invention.

FIG. 1 is a block diagram schematically showing structure of a print system having a data processing device according to the embodiment of the present invention.

In FIG. 1, a print system 100 includes image forming devices 220 and 230 having image output functions and personal computers (PC) 212 and 213, which are respectively connected with each other through a LAN.

Since the image forming devices 220 and 230 (data processing devices) have the same structure each other and also the PCs 212 and 213 have the same structure each other, hereinafter, the embodiments will be explained paying attention to the image forming device 220 and the PC 212.

The image forming device 220 has an operation unit 140 used for performing various operations by a user, a scanner unit 10 for reading image information in accordance with an instruction from the operation unit 140, a printer unit 20 for printing image data as an image on a sheet and a controller unit 30 for controlling the image outputs for the scanner unit 10 and the printer unit 20 in accordance with instructions from the operation unit 140 and the PC 212.

The PC 212 transmits print data being the image information to the image forming device 220 through the LAN (transmission means).

The image forming device 220 receives the print data from the PC 212 through the LAN and executes a print-output.

Figure 2:
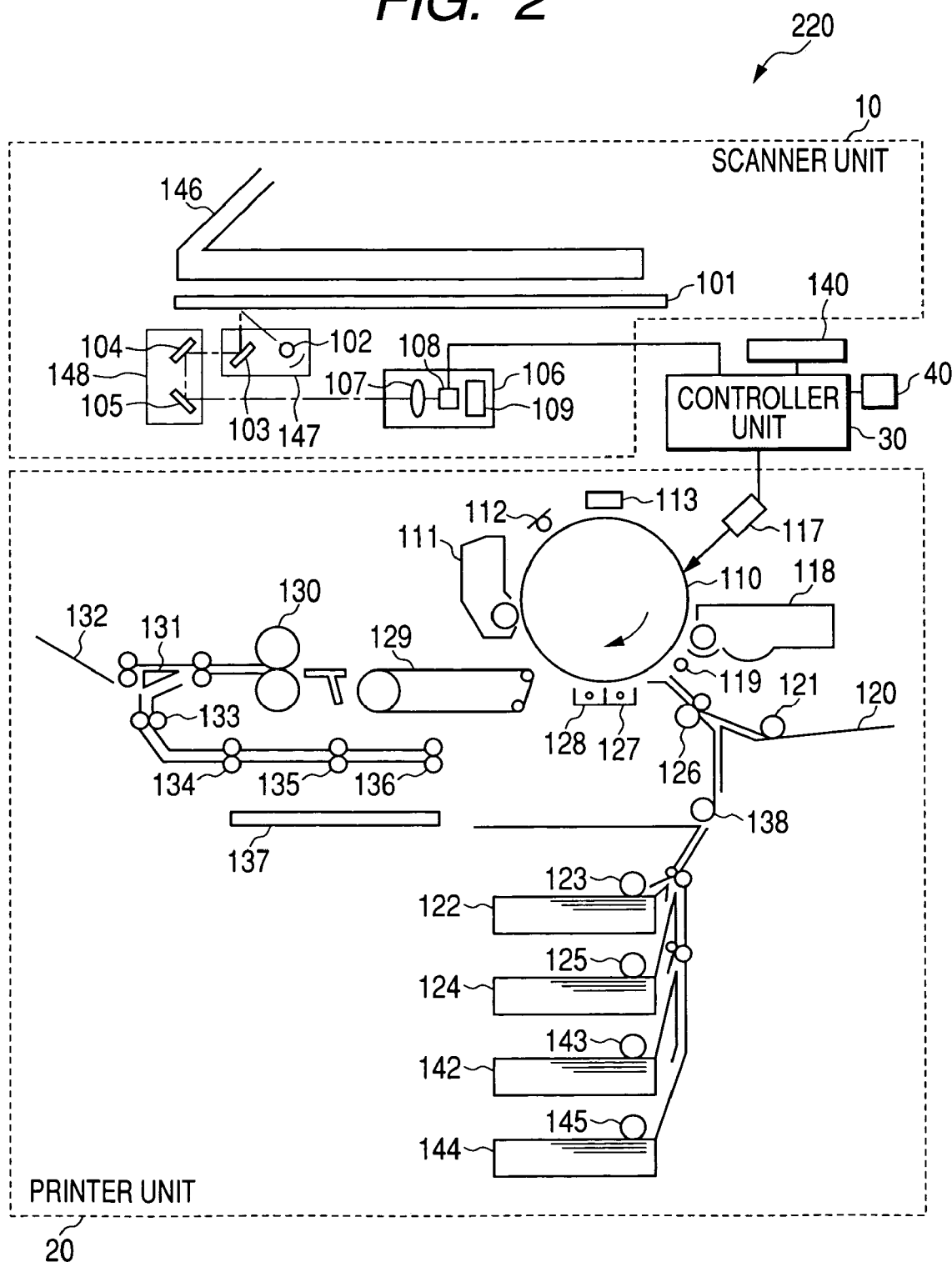
FIG. 2 is a view schematically showing structure of an image forming device shown in FIG. 1.

FIG. 2 is a view schematically showing structure of the image forming device 220 shown in FIG. 1.

The image forming device 220 in FIG. 2 is composed of the scanner unit 10, the printer unit 20, the controller unit 30, a power source device 40 for generating a DC power source from an AC power source and the operation unit 140 being a man-machine interface.

The scanner unit 10 has an original mounting plate glass 101 for mounting originals, an automatic original feeder 146 for successively feeding originals to a predetermined position on the original mounting plate glass 101, an original illuminating lamp 102 structured by, for example, a halogen lamp for exposure scanning the original mounted on the original mounting plate glass 101 in the main-scanning direction and a scanning mirror 103 for reflecting a reflection light reflected form the original by the original illuminating lamp 102, and further has a scanning unit 147 for performing the scan in the sub-scanning direction under the original mounting plate glass 101, scanning mirrors 104 and 105 for reflecting a reflection light from the scanning mirror 103 toward a CCD unit 106 to be described later, a scanning unit 148 for performing the scan in the sub-scanning direction with a half speed of the scanning unit 147 and the CCD unit 106 which includes an imaging lens 107 for forming an image upon receiving a reflection light from the scanning mirror 105, an image pickup element 108 composed of a CCD for converting data of a formed image into, for example, an eight-bit digital image signal and a CCD driver 109 for driving the image pickup element 108.

The controller unit 30 generates image data on the basis of an image signal which was output from the image pickup element 108 and controls the whole device after an instruction from the operation unit 140 was input. The details of the controller unit 30 will be described later with reference to FIG. 3.

The printer unit 20 includes a photosensitive drum 110, an exposure unit 117 composed of, for example, a semiconductor laser or the like for forming an electrostatic latent image by exposing the photosensitive drum 110 on the basis of the image data generated by the controller unit 30, a developing unit 118 for containing toner being a black developing agent and developing the electrostatic latent image on the photosensitive drum 110 by the toner and a pre-transfer charger 119 for applying a high voltage to the developed toner image on the photosensitive drum 110 before the image transfer.

The printer unit 20 also includes a manual sheet feed unit 120, sheet feed units 122, 124, 144 and 146 for storing sheets, sheet feed rollers 121, 123, 125, 143 and 145 for respectively feeding the sheets on the manual sheet feed unit 120 and the sheets stored in the sheet feed units 122, 124, 144 and 146 and a registration roller 126 for feeding the sheets fed from the sheet feed rollers 121, 123, 125, 143 and 145 to the photosensitive drum 110. The sheet feed rollers 121, 123, 125, 143 and 145 once stop the sheets on the manual sheet feed unit 120 and the sheets stored in the sheet feed units 122, 124, 144 and 146 at a position of the registration roller 126 and then start to feed the sheets so as to take a write-out timing with the developed toner image on the photosensitive drum 110.

The printer unit 20 further includes a transfer charger 127 for transferring the developed toner image on the photosensitive drum 110 to the sheet to be fed, a separation charger 128 for separating the sheet, to which the toner image was transferred from the photosensitive drum 110, from the photosensitive drum 110, a convey belt 129 for conveying the separated sheet to a fixing unit 130 to be described later, a cleaner 11 for retrieving the residual toner remained on the photosensitive drum 110 without being transferred, a pre-exposure lamp 112 for discharging electricity from the photosensitive drum and a primary charger 113 for uniformly charging the photosensitive drum with electricity.

The printer unit 20 further includes the fixing unit 130 for fixing the toner image onto the sheet to which the toner image was transferred, a sorter 132 for accepting the sheet, on which the toner image was fixed, through a flapper 131, an intermediate tray 137 for accepting the sheet, on which the toner image was fixed, through the flapper 131 and sheet feed rollers 133 to 136 and a sheet re-feed roller 138 for feeding the sheet in the intermediate tray 137 to the photosensitive drum 110 again. The flapper 131 is structured so that the feeding destination of the sheet, on which the toner image was fixed, can be switched between the sorter 132 and the intermediate tray 137. The sheet feed rollers 133 to 136 are structured so that the sheet, on which the toner image was fixed, can not be reversed (multiple copies of one side) or can be reversed (a copy of both sides).

Figure 3:
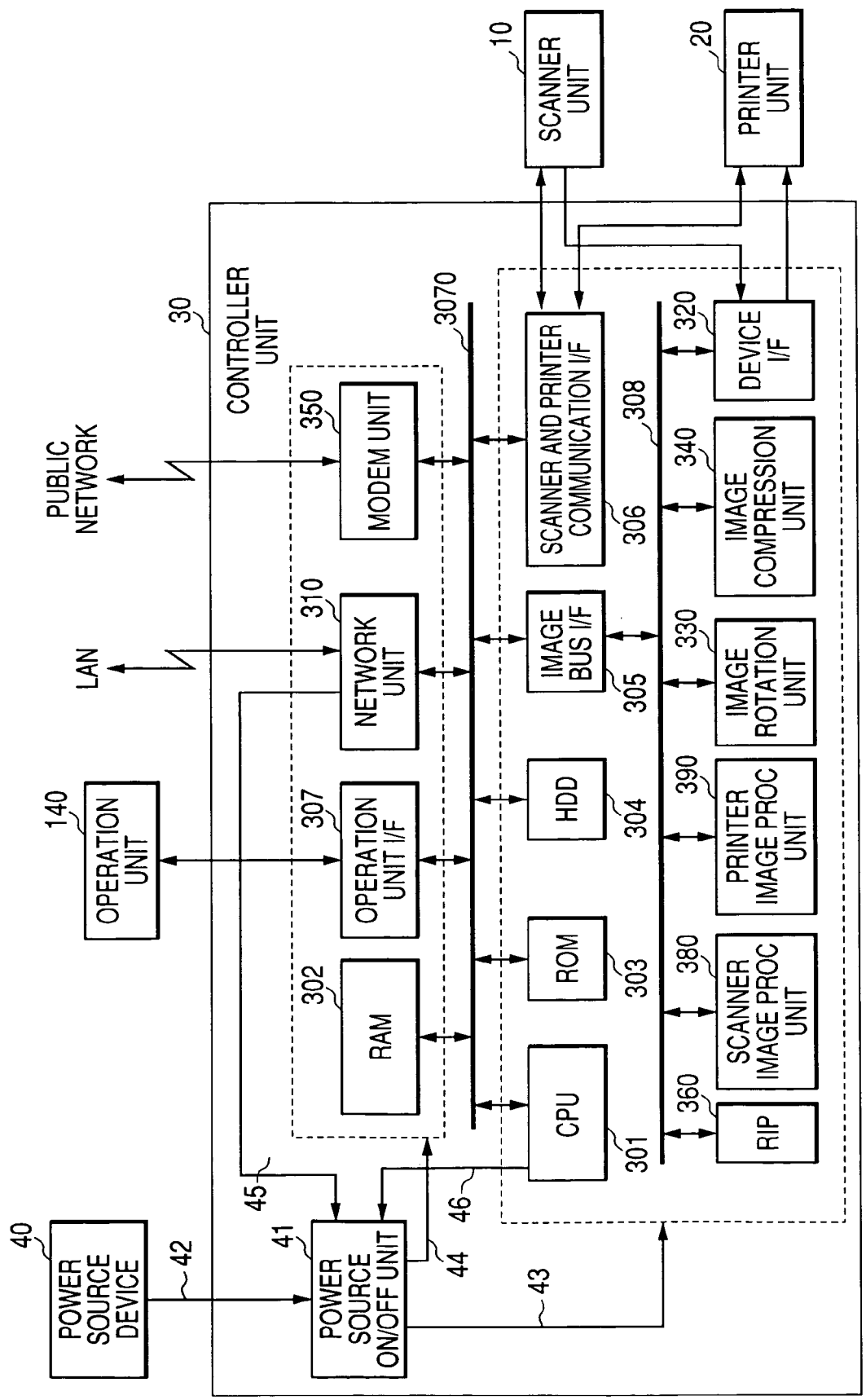
FIG. 3 is a block diagram schematically showing structure of a controller unit shown in FIG. 2.

FIG. 3 is a block diagram schematically showing structure of the controller unit 30 shown in FIG. 2.

In FIG. 3, the controller unit 30, which is connected to the scanner unit 10, the printer unit 20, a LAN and a public network, is a controller for performing the input/output of image data and device information.

The controller unit 30 includes a raster image processor (RIP) 360 for developing the PDL code into a bitmap image, a scanner image processing unit 380 for performing correction, processing and editing for input image data, a printer image processing unit 390 for performing correction of a printer, resolution conversion and the like for print-output image data, an image rotation unit 330 for rotating the image data, an image compression unit 340 for performing compression/expansion processes of the JPEG (Joint Photographic image Expert Group) for multi-level image data and compression/expansion processes of the JBIG (Joint Bi-level Image expert Group), the MMR (Modified Modified READ) and the MH (Modified Huffman) for binary image data, a device I/F 320 for performing conversion between a synchronous system and a non-synchronous system of the image data with a state that the controller unit 30 is connected to the scanner unit 10 and the printer unit 20 respectively being an image input device and an image output device and an image bus 308, which is constituted under the architecture of PCI (Peripheral Component Interconnect) bus or the standard of IEEE (Institute of Electrical and Electronic Engineers) 1394, for transmitting the image data with a high speed by mutually connecting the above sections.

The controller unit 30 also includes a CPU 301 being a controller of controlling the whole system, a RAM 302 being a system work memory used for operating the CPU 301 and also being an image memory used for temporarily storing the image data, an operation unit I/F 307, which is an interface unit of interfacing with the operation unit 140, outputs image data to be displayed on the operation unit 140 to the operation unit 140 and informs information which was input from the operation unit 140 by a user of the present system to the CPU 301, a network unit 310, which is connected to the LAN, performs the input/output of information, a MODEM unit 350, which is connected to a public network, performs the input/output of the information, a ROM 303 being a boot ROM of storing a boot program of the system, a hard disk drive (HDD) 304 of storing system software, image data, software counter values and the like, a scanner/printer communication I/F 306 for communicating with CPUs in the scanner unit 10 and the printer unit 20 respectively and a system bus 3070 for mutually connecting the above sections.

The controller unit 30 further includes an image bus I/F 305 being a bus bridge of converting the data structure by connecting with the system bus 3070 and the image bus 308 and a power source ON/OFF unit 41 which feeds the DC power source accepted from the power source device 40 through a power line 42 to a predetermined circuit element of the controller unit 30 through power feeding lines 43 and 44 on the basis of a control signal received from the network unit 310 through a control signal line 45 and a control signal received from the CPU 301 through a control signal line 46. The power source ON/OFF unit 41 selectively switches ON or OFF the power feeding lines 43 and 44. The power feeding line 43 is connected with the CPU 301, the ROM 303, the HDD 304, the image bus I/F 305, the scanner/printer communication I/F 306, the device I/F 320, the image rotation unit 330, the image compression unit 340, the RIP 360, the scanner image processing unit 380 and the printer image processing unit 390. The power feeding line 44 is connected to the RAM 302, the operation unit I/F 307, the network unit 310 and the MODEM unit 350.

In FIG. 3, when a main SW (not shown) being an original power source switch of the image forming device 220 is turned ON, the power source device 40 feeds the power to the controller unit 30, and the power source ON/OFF unit 41 feeds the power to the power feeding lines 43 and 44, then the controller unit 30 starts a startup sequence in accordance with the boot program stored into the ROM 303.

A system program to be executed by the image forming device 220 is stored into the HDD 304, and the system program is read from the HDD 304 on the basis of the above startup sequence to be downloaded to the RAM 302. A series of operations of the image processing device are performed by executing the system program, which was downloaded to the RAM 302, by the CPU 301.

The image forming device 220 shown in FIG. 1 prints out the image data transmitted from the PC 212 connected to the LAN as follows.

The CPU 301 stores print data being the image data received from the PC 212 connected to the LAN through the network unit 310 into the RAM 302, and this image data is supplied to the RIP 360 through the image bus I/F 305. The RIP 360 develops the PDL code of the image data into the bitmap image, and the image compression unit 340 properly executes a compression process to accumulate the compressed data in the HDD 304.

Then, the image data accumulated in the HDD 304 is supplied to the image compression unit 340 through the image bus I/F 305, the image compression unit 340 expands the supplied image data, the printer image processing unit 390 performs the correction of the printer, the conversion of resolution and the like, and the image rotation unit 330 properly executes an image data rotation process.

Subsequently, the image data, to which various processes were executed, is sent out as the print data to the printer unit 20 through the device I/F 320 to be print output by the printer unit 20.

The image forming device 220 in FIG. 1 has the function of a deep sleep mode being one of a power saving mode described in the following.

In the deep sleep mode, the power source device 40 feeds the power to the power source ON/OFF unit 41 through the power line 42, and the CPU 301 controls the power source ON/OFF unit 41 so that the power feeding line 43 becomes an OFF state and the power feeding line 44 becomes an ON state. At this time, since the power is not fed to a main circuit element including the CPU 301 of the controller unit 30, the power to be consumed by the image forming device 220 can be drastically suppressed. Further, when the network unit 310 receives a signal, since the network unit 310 can control the power source ON/OFF unit 41 so as to return to a normal mode, the image forming device 220 can perform an information communication of using the network unit 310.

Also, in the deep sleep mode, since the power is fed to the RAM 302, the RAM 302 backs up the system program by performing a self-refresh operation.

In the above explanation, the switching to the normal mode is performed by the network unit 310. However, the switching to the normal mode may be performed by the MODEM unit 350 or the operation unit I/F 307 without limiting to the network unit 310. In the former case, a facsimile communication of using the public network becomes possible. In the latter case, the reception of an instruction sent from a user who uses the operation unit I/F 307 becomes possible.

The image forming device 220 in FIG. 1 performs a return to the normal mode from the deep sleep mode as described in the following.

When the network unit 310 receives a print command from, for example, the PC 212, it is analyzed whether or not a data sequence corresponding to an inherent physical address set in the own unit is installed in a specific information packet included in the received print command, and when the corresponded data sequence is found, the power source ON/OFF unit 41 is controlled so as to turn ON the power feeding line 43 through the control signal line 45 and then the CPU 301 is started up. At this time, the CPU 301 judges whether or not a factor of starting up the CPU 301 depends on the return to the normal mode from the deep sleep mode in accordance with a state of the power source ON/OFF unit 41. When it is judged that the factor of starting up the CPU 301 depends on the return to the normal mode from the deep sleep mode, the startup sequence is started. At this time, a sequence of downloading the system program to the RAM 302 from the HDD 304 is omitted, and the system program backed up by the RAM 302 when shifting to the deep sleep mode is utilized. Accordingly, the control unit 30, which comes into the normal mode, responds to the print command from the PC and causes the printer unit 20 to start the print-output.

When the print-output is terminated, the CPU 301 starts to count the time and instructs the power source ON/OFF unit 41 to switch to the deep sleep mode when a previously set time has been elapsed under a state that there is not an input from the outside. The power source ON/OFF unit 41 turns OFF the power feeding line 43, then the control unit 30 is switched to the deep sleep mode of the low power consumption.

At this time, the CPU 301 notifies a fact of switching to the deep sleep mode to the PC 212. This notification is executed because the CPU 301 can not respond to an information packet form the PC 212 and can not notify a state in the deep sleep mode to the PC 212 since the electric current does not flow in the CPU 301 in the deep sleep mode, and because a specific information packet can not be transmitted if the print device is not previously recognized in order to be shifted to the normal mode by transmitting the specific information packet such as, for example, a magic packet or the like to the print device in the deep sleep mode by the PC 212.

When the PC 212 searches plural print devices connected to the LAN, an information packet such as a broadcast (ARP: Address Resolution Protocol) or the like, to which the print device in the normal mode can respond, is transmitted to the respective print devices. However, as against the above situation, the print device in the deep sleep mode can not respond to the information packet. This fact is utilized in an overall search, wherein the specific information packet is prepared for the purpose of searching all the print devices in the deep sleep mode, and the interpretation is performed in the network unit 310, and then all the print devices in the deep sleep mode are shifted to the normal mode.

Figure 4:
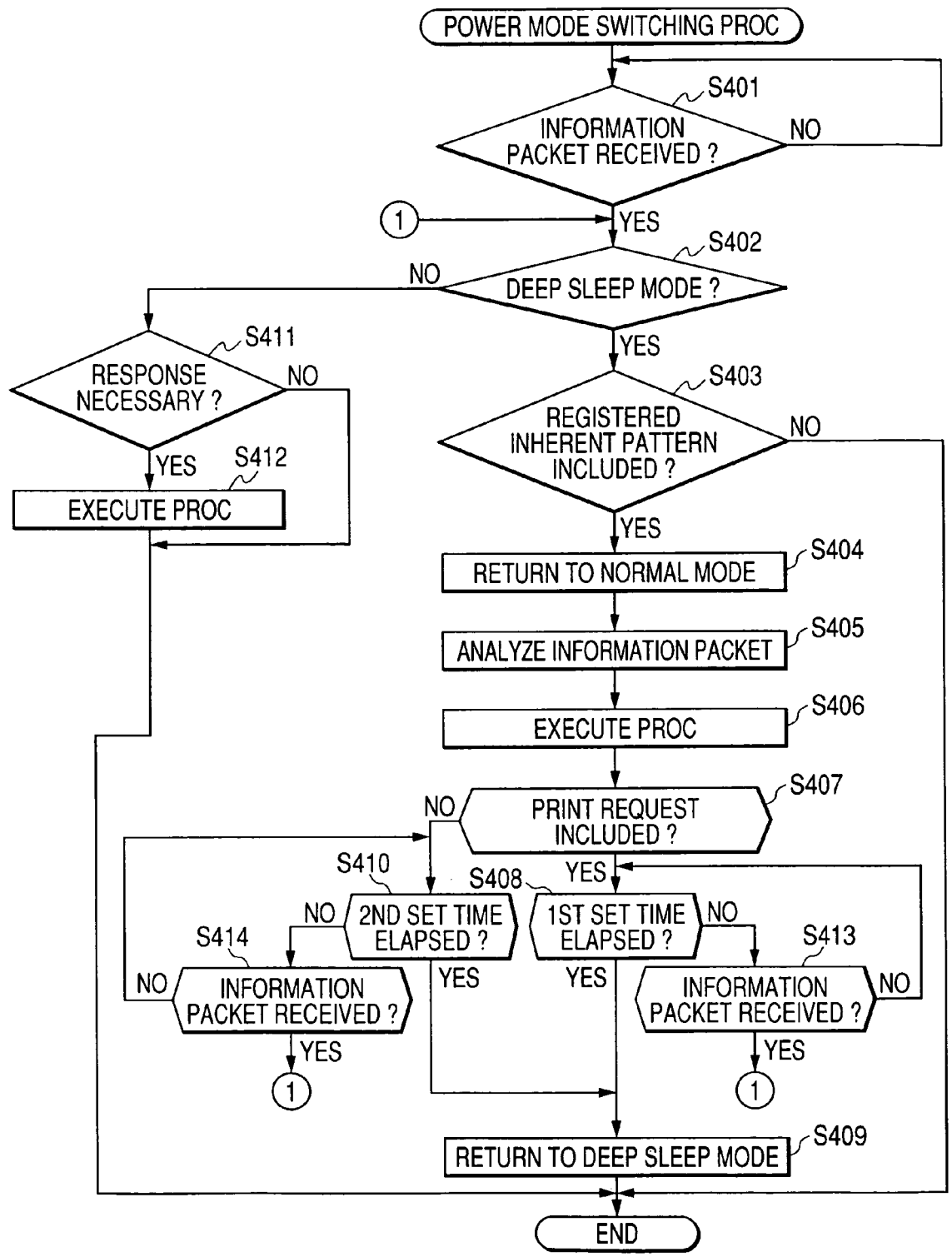
FIG. 4 is a flowchart showing a power mode switching process executed by the image forming device shown in FIG. 1.

FIG. 4 is a flowchart showing a power mode switching process executed by the image forming device 220 shown in FIG. 1

In FIG. 4, when the image forming device 220 receives the information packet from the PC 212 (YES in a step S401) (reception means), it is discriminated whether or not the image forming device 220 is in the deep sleep mode (step S402), and when the image forming device 220 is in the deep sleep mode, the network unit 310 discriminates whether or not the received information packet includes an inherent pattern previously registered in the network unit 310 (step S403). When the inherent pattern is not included, the present process is immediately terminated, and when the inherent pattern is included, the network unit 310 controls the image forming device 220 to return to the normal mode from the deep sleep mode (step S404) (release means). The CPU 301 receives the succeeding information packet and analyzes the received information packet (step S405) then executes a process in accordance with the information packet (step S406).

In a subsequent step S407, the CPU 301 discriminates whether or not a print request is included in the received information packet (discrimination means), and when the print request is included, the CPU 301 discriminates whether a first set time which was previously set has been elapsed after terminating a print process under the state without an external request. If the first set time has been elapsed (YES in a step S408), the CPU 301 controls the image forming device 220 to return to the deep sleep mode again (step S409) (shift means), then the present process is terminated. Before elapsing the first set time (NO in the step S408), when the information packet is newly received (YES in a step S413), a flow is shifted to the step S402.

As a result of the discrimination in the step S407, when the print request is not included, for example, when the received information packet is a search packet, the CPU 301 discriminates whether a second set time which was previously set has been elapsed under the state without an external request. If the second set time has been elapsed (YES in a step S410), the CPU 301 controls the image forming device 220 to return to the deep sleep mode again (step S409), then the present process is terminated. Before elapsing the second set time (NO in the step S410), when the information packet is newly received (YES in a step S414), the flow is shifted to the step S402. It should be noted that when the PC transmits print data without a print request, it is discriminated whether or not the print data is included in the information packet in the step S407.

The second set time may be 0. If the second set time is 0, the CPU 301 controls the image forming device 220 to return to the deep sleep mode without performing step S410 and step S414.

As a result of discrimination in the step S402, when the image forming device 220 is not in the deep sleep mode, the CPU 301 discriminates whether or not it is necessary to respond to the received information packet (step S411), and when it is necessary to respond to the received information packet, the present process is terminated after the CPU 301 executes a process in accordance with the received information packet (step S412), and when it is not necessary to respond to the received information packet, the present process is immediately terminated.

On the other hand, when the PC 212 causes the image forming device 220 to perform the print, the information packet which includes the registered inherent pattern is transmitted to the image forming device 220, and the print request or the print data is transmitted to the image forming device 220 after confirming that the image forming device 220 returned to the normal mode. As a method of confirming that the image forming device 220 returned to the normal mode, there is a method wherein the image forming device 220 transmits a respond packet to the information packet which includes the registered inherent pattern after returning to the normal mode and the PC 212 receives the respond packet thereby confirming that the image forming device 220 returned to the normal mode, and there is a method wherein the PC 212 obtains status information of the image forming device 220 after transmitting the information packet which includes the registered inherent pattern and it is confirmed if the status information indicates the normal mode.

According to a process shown in FIG. 4, the CPU 301 controls the image forming device 220 to return to the deep sleep mode again (step S409) if the first set time which was previously set has been elapsed (YES in a step S408) after terminating the print process under the state without the external request, and when the print request is not included, and if the second set time which was previously set has been elapsed (YES in a step S410) under the state without the external request, the CPU 301 controls the image forming device 220 to return to the deep sleep mode again (step S409). Therefore, the shift to the deep sleep mode can be controlled according to the presence/absence of the print request, thereby realizing to reduce the power to be consumed by the image forming device 220.

Accordingly, the image forming device 220 can immediately return to the deep sleep mode when the print request is not included in the information packet by setting that the second set time is sufficiently shortened as compared with the first set time, thereby further improving the power saving efficiency of the image forming device 220.

Accordingly, it can be prevented to repeat the deep sleep mode and the normal mode frequently when the image forming device 220 frequently receives the information packet which does not include the print request by setting that the second set time becomes longer than a predetermined time, thereby preventing the deterioration of parts due to the frequent repeat of the deep sleep mode and the normal mode.

It should be noted that the first set time and the second set time may be respectively determined with a fixed condition or may be set or changed by the operation unit 104.

At the step S404 of FIG. 4, the network unit 310 switches from the deep sleep mode to the normal mode. However, it should be noted that, at the step S404, the network unit 310 may switch from the deep sleep mode to a second sleep mode which is different from the deep sleep mode and the normal mode.

In this case, when the information packet analyzed at the step S405 includes the print request, the CPU 301 switches from the second sleep mode to the normal mode at the step S406 and executes the process in accordance with the information packet in the normal mode. When the analyzed information packet dose not includes the print request, the CPU 301 executes the process in accordance with the information packet in the second sleep mode.

Some parts of the image forming device 220 (HDD 304 etc.), exclusive of the CPU 301 and the ROM 303, are powered off in the second sleep mode. That is, it should be noted that the second sleep mode can reduce more consumption power than the normal mode.

Figure 5:
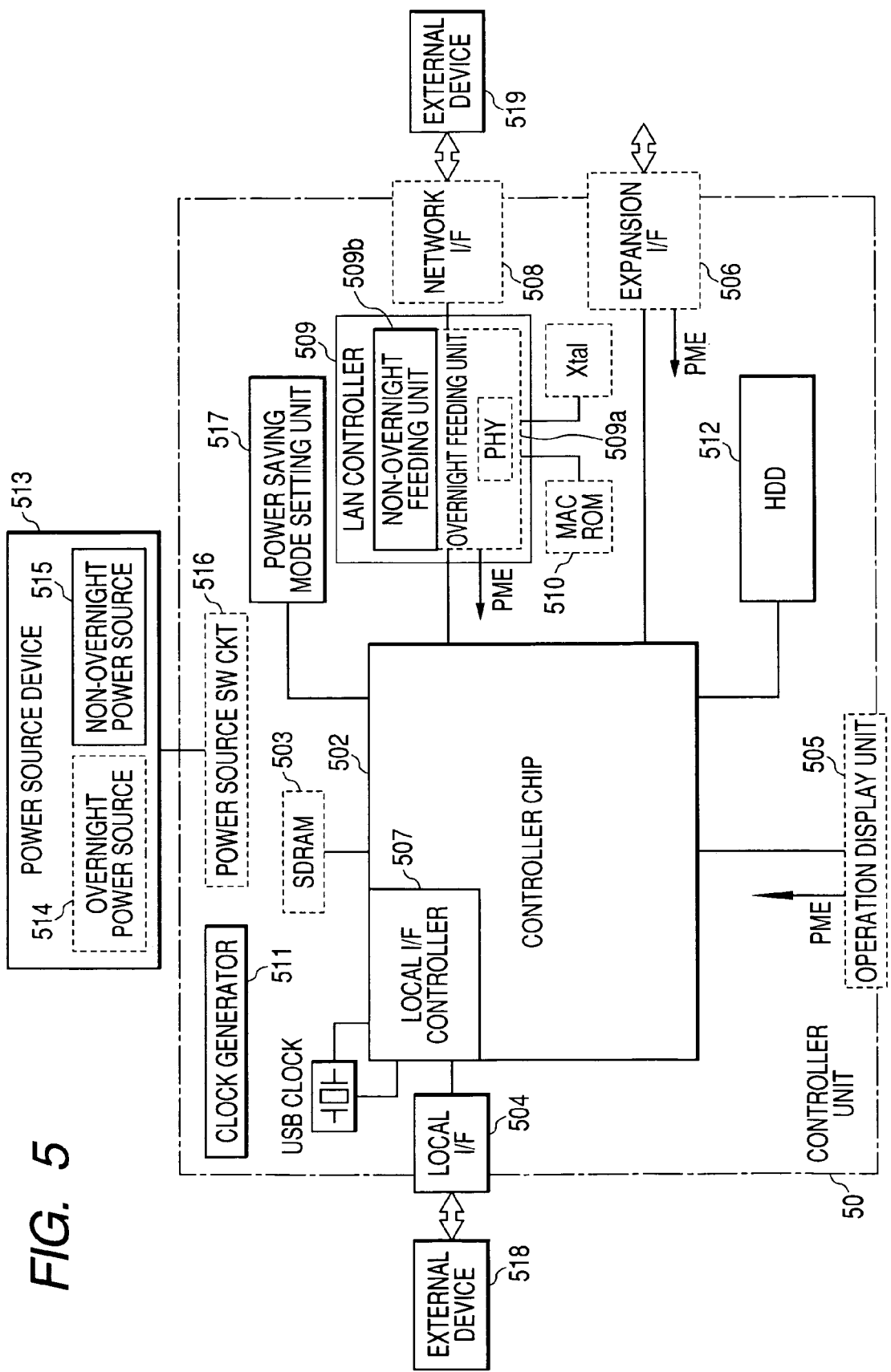
FIG. 5 is a block diagram schematically showing structure of a modified example of the controller unit shown in FIG. 3.

FIG. 5 is a block diagram schematically showing structure of a modified example of the controller unit 30 shown in FIG. 3.

In FIG. 5, a controller unit 50 includes a power source switch circuit 516, which is connected to a power source device 513 composed of an overnight power source 514 and a non-overnight power source 515, performs a switching operation between the overnight power source 514 and the non-overnight power source 515 and is structured by an IC chip of FET (Field Effect Transistor) which consumes a little power, a clock generator 511, a local I/F 504 to be connected to a external device 518, a network I/F 508 to be connected to an external device 519 through a 10/100BASE-T connector and a MACROM (Media Access Control ROM) 510.

The controller unit 50 also includes a LAN controller 509, which is composed of an overnight feeding unit 509a and a non-overnight feeding unit 509b and is connected to the network I/F 508 and the MACROM 510, manages a control of communication performed with the external device through the network I/F 508 and issues a power activation signal-(hereinafter, called a "PME") to be described later, an expansion I/F 506, to which an optional device is mounted in order to expand the function, issues the PME, a hard disk drive (HDD) 512 which stores an initialization program to be read in at a time of turning ON the power of the image forming device 220 or a main program for defining an operation of the controller unit 50, an operation display unit 505, which displays status of the image forming device 220 including the controller unit 50 and is utilized when a user modifies parameters concerned with various image processes, issues the PME, a power saving mode setting unit 517 which holds the setting contents concerned with the discrimination whether or not it is shifted to the deep sleep mode and an SDRAM (Synchronous Dynamic RAM) 503 which temporarily stores data obtained by developing the print data received from the external device through any interface, various programs, various parameters to be written in the register when each of functions is initialized. The above sections are connected to a controller chip 502.

The PME, which is an abbreviation of "Power Management Event", is utilized for an instruction of turning ON the power of a system. The PME can be received by a system which has a bus based on the PCI2.2 standard. In the present embodiment, the PME is utilized as a signal for returning to the normal mode from the deep sleep mode. However, in the present invention, it is not limited to the PME but an independent instruction signal or another instruction signal which can instruct to turn ON the power can be applied to the present invention.

The controller chip 502 contains a local I/F controller 507 connected to the local I/F 504 and includes, although they are not shown, a ROM for storing various programs, an interface, a RAM (including DRAM), a PCI (Peripheral Component Interconnect) bus I/F, a video I/F, the hardware for developing data of the description language for the print transmitted from an external device and an ASIC (Application Specific Integrated Circuit) having a function of compressing and expanding various data.

The overnight power source 514 feeds the power to an overnight feeding group composed of the power source switch circuit 516, the operation display unit 505, the network I/F 508, the expansion I/F 506, the overnight feeding unit 509a of the LAN controller 509 and the MACROM 510 (these sections are denoted by surrounded broken lines in FIG. 5).

The non-overnight power source 515 feeds the power to a non-overnight feeding group composed of the controller chip 502, the non-overnight feeding unit 509b of the LAN controller 509, the clock generator 511, the local I/F 504, the power saving mode setting unit 517 and the hard disk drive 512 (these sections are denoted by surrounded actual lines in FIG. 5).

The circuit elements of the overnight feeding group are in a state that it is unable to receive the print data from the external device, execute a process thereof and respond to an obtaining request of status information. That is, the circuit elements are necessary for returning to the normal mode from the deep sleep mode and always require the power feeding even when a state without an external request continues. Therefore, the controller unit 50 controls the power source switch circuit 516 in order that only the overnight power source 514 is caused to feed the power and the non-overnight power source 515 is caused not to feed the power when it is the deep sleep mode, and when it is returned to the normal mode, the non-overnight power source 515 is also caused to feed the power. In the deep sleep mode, the power to be consumed by the circuit element which manages the local I/F controller 507 is saved.

When the power source switch circuit 516 receives the PME from the operation display unit 505, the expansion I/F 506, the LAN controller 509 or the like, the power is fed to the circuit elements denoted by the actual lines by the non-overnight power source 515, and the image forming device 220 returns to the normal mode from the deep sleep mode.

The setting contents concerned with the shift to the deep sleep mode from the normal mode are held in the power saving mode setting unit 517, and the held setting may be interpreted as the setting of determining whether or not it is shifted to the deep sleep mode from the normal mode in a case that the external device 518 is connected through the local I/F 504.

In the LAN controller 509, the overnight feeding unit 509a, which has a function of recognizing the specific information packet through the network I/F 508, recognizes the specific information packet such as the magic packet and issues the PME. Of course, the specific information packet is not limited to the magic packet but a specific information packet which is uniquely defined is available. In this case, the uniquely defined specific information packet may be previously set in the MACROM 510. The non-overnight feeding unit 509b, to which the power is simultaneously fed when the overnight feeding unit 509a issues the PME, manages a function of performing the data communication with the controller chip 502 when the specific information packed is not recognized.

Incidentally, it is needless to say that the controller unit 50 in FIG. 5 executes a process in FIG. 4.

According to the data processing device and a power saving control method concerned with the present invention, the power to be consumed can be more decreased even if there is a case that the deep sleep mode is released.

The decreasing amount of the power to be consumed when the print process is not executed can be increased, even if the deep sleep mode is released in spite of a fact that the print process is not executed.

Since the second set time is shorter than the first set time, a time required for sifting to the power saving condition from the state of releasing the power saving condition can be shortened. Thereby, the power to be consumed can be surely decreased.

Since specific data is a command for releasing the sleep of the print device but is not a command for executing a print process, the power saving condition of the print device can be released other than a case that a computer terminal causes the print device to execute the print process.

When the specific data contains a data sequence generated based on a physical address inherent in the data processing device, since the power saving condition of the data processing device is released, the power saving condition of a desired data processing device can be surely released.

Since second kind of data is a search packet used for searching the data processing devices to be connected through a network after forcedly releasing the power saving condition of the plural data processing devices which were in the power saving condition, all of the plural print devices connected to the network can be surely searched.

This application claims priority from Japanese Patent Application No. 2004-201802 filed Jul. 8, 2004, which is hereby incorporated by reference herein.

What is claimed is:

1. A data processing device which can communicate with a computer terminal, comprising:
   a reception unit adapted to receive data transmitted from the computer terminal;
   a shift unit adapted to shift a state of said data processing device to a power saving state after elapse of a predetermined time under a state that no data is received by said reception unit; and
   a release unit adapted to release the power saving state in a case where specific data transmitted from the computer terminal is received by said reception unit,
   wherein, after the power saving state is released by said release unit,
   in a case where the specific data received by said reception unit is a first kind of the specific data and the power saving state is released by said release unit, said shift unit shifts the state of said data processing device to the power saving state after elapse of a first predetermined time, and
   in a case where the specific data received by said reception unit is a second kind of the specific data different from the first kind of the specific data and the power saving state is released by said release unit, said shift unit shifts the state of said data processing device to the power saving state after elapse of a second predetermined time different from the first predetermined time.

2. A data processing device according to claim 1, further comprising a printing unit adapted to perform a print process on a sheet based on print data,
   wherein said shift unit further comprises a discrimination unit adapted to discriminate, after the power saving state is released by said release unit, whether or not at least one of a print request or the print data is included in the specific data received by said reception unit, and
   wherein, in a case where at least one of the print request or the print data is included in the specific data received by said reception unit, said shift unit shifts the state of said data processing device to the power saving state after the elapse of the first predetermined time.

3. A data processing device according to claim 1, wherein the second predetermined time is shorter than the first predetermined time.

4. A data processing device according to claim 2, wherein the specific data indicates a command for releasing the power saving state of said data processing device but is not a print command for causing said data processing device to perform the print process.

5. A data processing device according to claim 1, wherein:
   the specific data includes a data sequence generated based on a physical address inherent in said data processing device, and
   in a case where the specific data includes the generated data sequence, said release unit releases the power saving state of said data processing device.

6. A data processing device according to claim 1, wherein the second kind of the specific data is a search packet for searching, after the power saving state of the plural in-power-saving-state data processing devices is released, the plural data processing devices connected through a network.

7. A power saving control method for a data processing device which can communicate with a computer terminal, said method comprising:

a reception step of receiving data transmitted from the computer terminal;

a shift step of shifting a state of the data processing device to a power saving state after elapse of a predetermined time under a state that no data is received in said reception step; and a release step of releasing the power saving state in a case where specific data transmitted from the computer terminal is received by said reception unit, wherein, in said shift step, after the power saving state is released in said release step, in a case where the specific data received in said reception step is a first kind of the specific data and the power saving state is released in said release step, the state of the data processing device is shifted to the power saving state after elapse of a first predetermined time in said shift step, and in a case where the specific data received in said reception step is a second kind of the specific data different from the first kind of the specific data and the power saving state is released in said release step, the state of the data processing device is shifted to the power saving state after elapse of a second predetermined time different from the first predetermined time in said shift step.

8. A data processing device according to claim 2, wherein the second predetermined time is shorter than the first predetermined time.

9. A data processing device according to claim 3, wherein the second predetermined time is longer than a previously determined time.

10. A power saving control method according to claim 7, further comprising:

a printing step of performing a print process on a sheet based on print data; and a discrimination step of discriminating, after the power saving state is released in said release step, whether or not at least one of a print request or the print data is included in the specific data received in said reception step, wherein, in a case where at least one of the print request or the print data is included in the specific data received in said reception step, the state of said data processing device is shifted to the power saving state after the elapse of the first predetermined time in said shift step.

11. A power saving control method according to claim 7, wherein the second predetermined time is shorter than the first predetermined time.

12. A power saving control method according to claim 10, wherein the second predetermined time is longer than a previously determined time.

13. A power saving control method according to claim 12, wherein the second predetermined time is shorter than the first predetermined time.

14. A power saving control method according to claim 10, wherein the specific data indicates a command for releasing the power saving state of said data processing device but is not a print command for causing said data processing device to perform the print process.

15. A power saving control method according to claim 7, wherein:

the specific data includes a data sequence generated based on a physical address inherent in said data processing device, and in a case where the specific data includes the generated data sequence, the power saving state of said data processing device is released in said release step.

16. A power saving control method according to claim 7, wherein the second kind of the specific data is a search packet for searching, after the power saving state of the plural in-power-saving-state data processing devices is released, the plural data processing devices connected through a network.

* * * * *